Feb. 3, 1959
S. R. HEMPHILL
2,871,999
BRAKE CONTROL SYSTEM
Filed Aug. 27, 1954
4 Sheets-Sheet 1
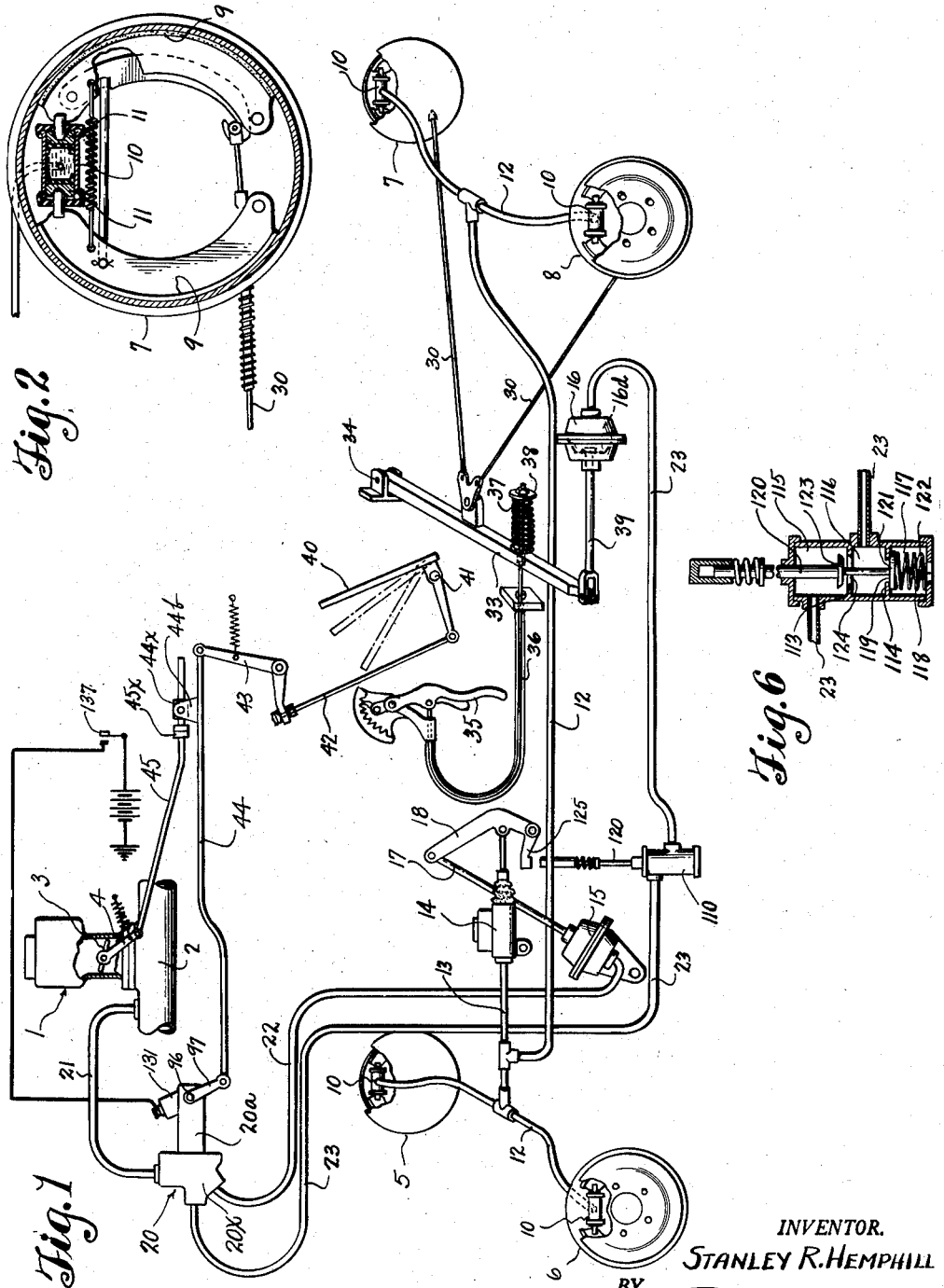
INVENTOR.
STANLEY R. HEMPHILL
BY
Cook & Robinson
ATTORNEYS

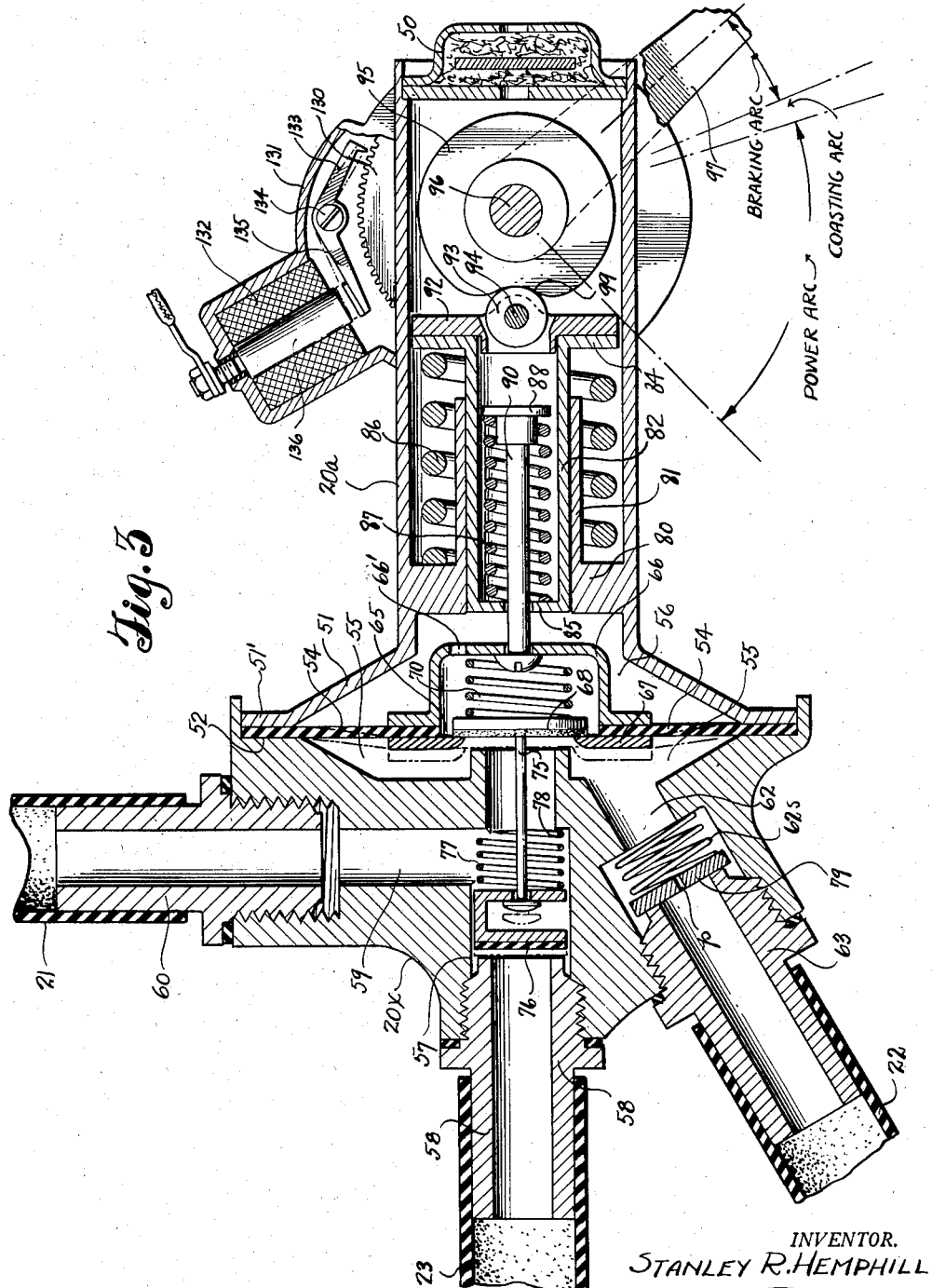

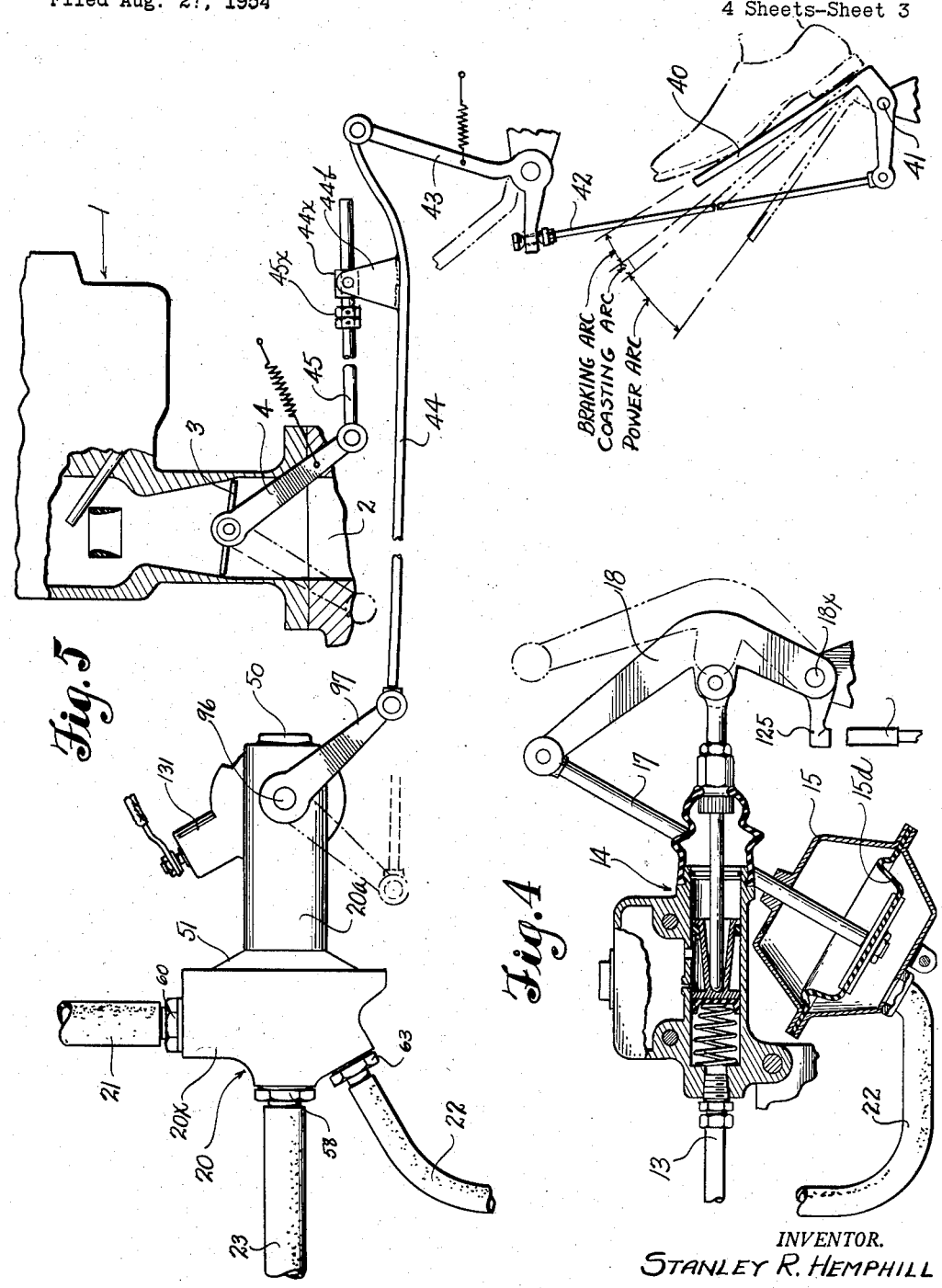

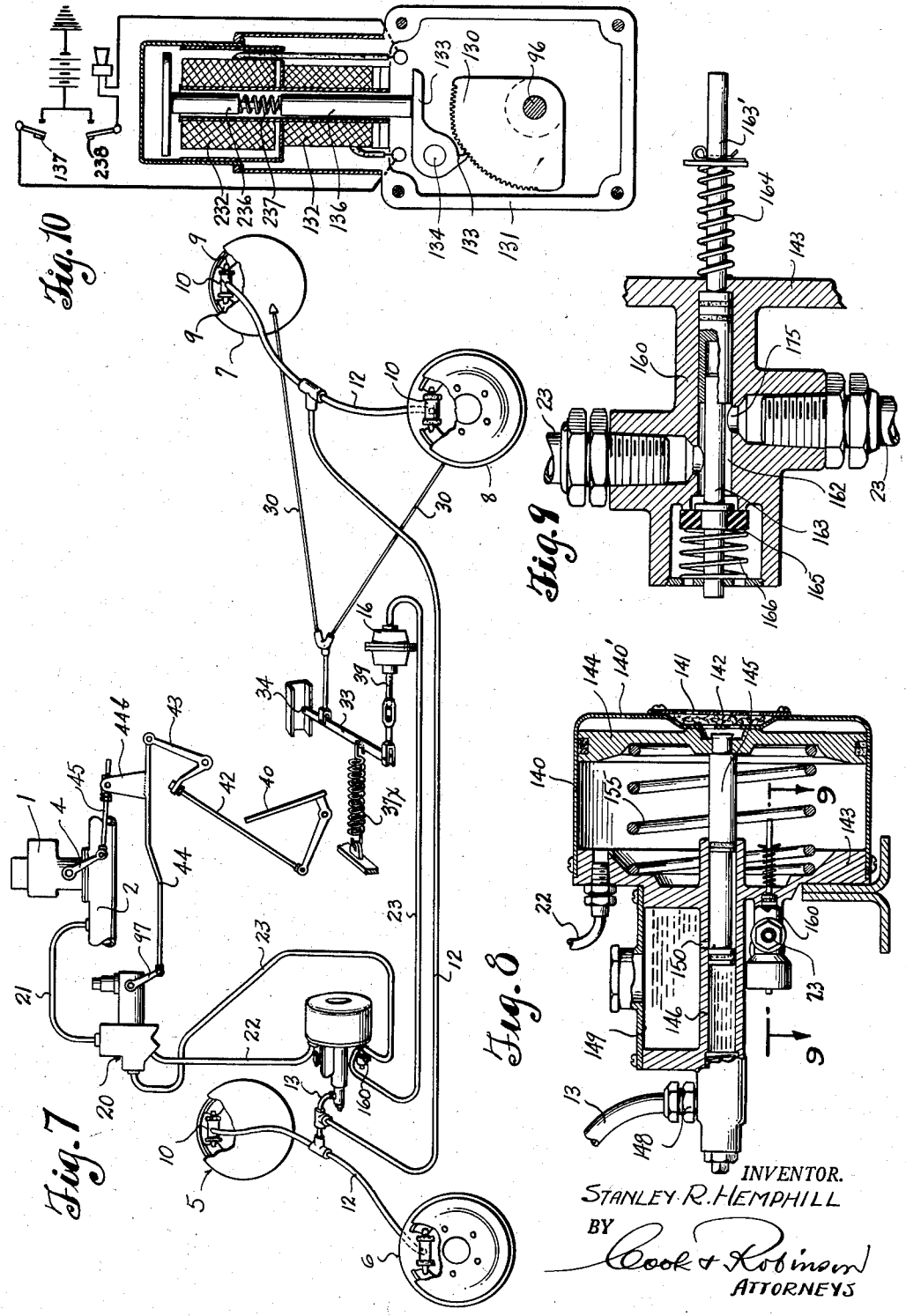

United States Patent Office 2,871,999
Patented Feb. 3, 1959

2,871,999

BRAKE CONTROL SYSTEM

Stanley Rice Hemphill, Pomona, Calif., assignor to Safety Automatic Brake Corporation, Denver, Colo., a corporation of Nevada Application August 27, 1954, Serial No. 452,633

13 Claims. (Cl. 192—3)

This invention relates to brake control systems operated by an initial range of an accelerator pedal, for example, a system as applied to an automobile, truck or the like that is powered by an internal combustion engine to which fuel is supplied by a carburetor, under control of the ordinarily used foot operated accelerator pedal.

The present invention provides further simplicity and comfort of driving in eliminating the separate power brake pedal and incorporating it with the accelerator to provide a single pedal control of the brakes and the accelerator in conveniently successive ranges of depression.

This brake control system further incorporates: a safety feature, in the event of failure of the service brakes, providing automatic operation of the emergency brakes; another safety feature is a control providing automatically set and released emergency brakes whenever the engine is stopped and started respectively; and a cruise control means for holding the accelerator pedal in any control position desired to relieve strain on the driver when such position is required for long driving periods, and for instantly releasing it in an emergency.

The present invention is in the nature of an improvement upon the automatic braking system which is the subject matter of United States Patent No. 2,325,771, issued to me on August 3, 1943.

More specifically stated, the present invention resides in an improved brake operating means that is especially adapted for use with the wheel braking mechanisms of present day automobiles, trucks, and the like, and which is controlled by a valve mechanism that is operated through a connection made with the linkage by which the accelerator pedal is connected with the throttle valve lever of the carburetor.

It is the principal object of the present invention to provide a brake control mechanism that is automatic in its operation in conjunction with the movements of the accelerator pedal; that is of the same general character as that of my prior patent above mentioned, but which I consider to be a material improvement thereon in that it is more sensitive; more reliable in use; smoother in its action; more practical in its construction and better adapted for use with automobiles as equipped with present day wheel braking means.

Explanatory to the present invention it will be here noted that practically all present day automobiles are equipped with standardized controls, including wheel braking devices that are designed to be energized through the mediacy of a manually actuated "service brake pedal," or by the manually actuated "emergency brake lever." Also, each of such vehicles is equipped with an accelerator pedal as the means of controlling the feeding of carbureted fuel to the engine to control its speed or power. Furthermore, in many automobiles now in use, a foot pedal is employed to disengage the clutch for engine idling or for gear shifting as is well understood. The service brake pedal and the accelerator pedal are invariably located adjacent each other, and it is customary for the vehicle driver to shift his right foot from one to the other for their selective actuation. Many traffic accidents and many difficulties of vehicle operation can be traced directly, or indirectly, to the fact that the operator is required to shift his foot from one pedal to the other in the operation and control of the vehicle.

In view of the foregoing explanatory statements, it has been a further object of the present invention to provide a novel combination of parts designed for the automatic braking of an automotive vehicle, under all normal driving conditions, through the mediacy or under control of the accelerator pedal.

It is also an object of the present invention to provide an improved automatic system of vehicle braking and control that is accomplished through the mediacy of the accelerator pedal, without any interference with its normal use as an engine controlling or fuel feeding member, and incident to its movements.

Still further objects and advantages of the invention reside in the utilization of vacuum, as produced in the intake manifold of the engine incident to its operation, for the functional application of vacuum for braking purposes through use of a novel form of valve by which the present invention is characterized and which valve operates automatically in conjunction with the accelerator pedal movements.

A further object of the invention resides in the provision of a novel "cruise control" in conjunction with the present mechanism that provides for retaining the carburetor throttle lever at a set position.

Still another object of the invention resides in the details of construction of parts, in their combination and in the mode of use of the combination of parts with the accelerator pedal and throttle valve of the carburetor, as will hereinafter be fully described.

In accomplishing the above mentioned and other objects of the invention, I have provided the improved details of construction, the preferred forms of which are illustrated in the accompanying drawings, wherein:

Fig. 1 is a view diagrammatically showing the combination of parts embodied by the present invention as associated with the accelerator pedal, the carburetor throttle valve control lever and wheel braking devices of a typical present day automobile.

Fig. 2 is a sectional detail of parts of the hydraulic braking means of one of the vehicle wheels; the hydraulic cylinder being shown in section for purpose of explanation.

Fig. 3 is a substantially enlarged longitudinal sectional view of the automatic brake control valve of the present invention.

Fig. 4 is a sectional detail of the booster cylinder and master cylinder as used in conjunction with the control valve for service brake operation.

Fig. 5 is a view illustrating the various operating connections between accelerator pedal, control valve, and carburetor throttle lever.

Fig. 6 is a sectional detail of a safety valve mechanism.

Fig. 7 is a diagrammatic layout of parts comprised by the present invention wherein use of an alternative form of master cylinder and emergency valve is employed.

Fig. 8 is a longitudinal sectional view of the master cylinder and booster assembly of the system of Fig. 7.

Fig. 9 is a sectional detail of the emergency valve mechanism used in the cylinder of Fig. 7.

Fig. 10 is a sectional detail of an alternative form of cruise control device.

In the present drawings, particularly in Figs. 4 and 5, the parts have been illustrated out of relative proportion in order that their structures might be better understood.

Furthermore, in the various views, I have shown only those parts of an automotive vehicle thought to be necessary for a proper explanation of the purpose, and mode of operation of the present braking system.

Referring more in detail to the drawings:

In Figs. 1 and 7, 1 designates a carburetor that is typical of those in general use with present day automotive vehicles for supplying carbureted fuel mixture to the engine which powers the vehicle. The carburetor shown has the usual fuel feeding connection with the suction, or intake manifold 2 of the engine, and it is to be understood that, through this connection, the suction or partial vacuum created in the manifold 2 by the operation of the engine is transmitted to the fuel outlet of the carburetor. The air intake passage of the carburetor as usual, is equipped with a throttle valve 3 that may be pivotally adjusted to regulate the flow of carbureted fuel to the engine cylinders by a throttle lever 4.

In the diagrammatic illustration of parts as seen in Figs. 1 and 7, the brake drums of the four wheels of the vehicle are designated, respectively, by reference numerals 5, 6, 7 and 8. The brakes are here indicated as being of the present day hydraulic type, and as service brakes, are adapted to be simultaneously applied. As indicated in Fig. 2, a pair of brake shoes 9—9 is associated with each brake drum, and each pair of shoes is functionally actuated by the application of a hydraulic pressure medium to a pressure cylinder 10 located between the movable ends of the shoes; this form of brake being well known in the art, forms no part of this invention in itself. Each cylinder 10 has pistons 11—11 fitted in its opposite ends, confining hydraulic pressure medium of the system between them and these pistons actuate the brake shoes for the braking operation.

The hydraulic cylinders 10, as applied to the four wheels are interconnected by hydraulic pressure lines designated by numeral 12, which lines, as seen in Fig. 1, are connected by a pressure line 13 with a master cylinder 14 through the operation of which master cylinder all wheel brakes may be simultaneously applied and released. The master cylinder as seen in Fig. 1 may be like that shown in Fig. 4 presently described.

In Fig. 7, I have illustrated a combined master cylinder and booster assembly which can be used as an alternative to the parts seen in Figs. 1 and 4. This will be described later in this specification.

For the control and actuation of the wheel braking devices in accordance with this invention as disclosed in Fig. 1, I employ two booster cylinders, which are designated by reference numerals 15 and 16, respectively, and which may be of the construction of that shown in Fig. 4. The booster cylinder 15 is here provided to control the operation of the "service brakes," and for this purpose it has its diaphragm 15d connected by a rod 17 with an operating lever 18 for the master cylinder 14 as shown in Fig. 4. This connection provides that energization of this booster cylinder 15 effects an oscillating movement of the lever 18, about its pivotal mounting 18x for the application of braking forces through the hydraulic pressure medium contained in lines 13 and 12 to all brake cylinders 10. The booster cylinder 16 as used in Fig. 1, is designed only for the release of the emergency brakes, and its operating connection therewith and manner of use will be presently described.

Each booster cylinder 15 and 16 is of the conventional type, closed at its ends and centrally divided by a piston in the form of a flexible diaphragm. Also, each cylinder has a pipe line providing a vacuum connection with the intake manifold 2 of the engine; these connections, however, being made through the novel control valve, presently to be described, which is one of the improved and important features or elements of the present invention. This brake control valve is shown in enlarged longitudinal section in Fig. 3 and as there shown, its various parts are in the position they assume when the engine is at rest.

In the diagrammatic showing of the system in Fig. 1, the brake control valve has been designated in its entirety by reference numeral 20. Also, in Fig. 1, the valve is shown as having a suction pipe line or conduit connection 21 with the engine manifold 2, and as having suction line connections 22 and 23 leading therefrom to the booster cylinders 15 and 16, respectively. It is through the valve 20, as controlled by connections with the accelerator pedal that the brakes and their functional operations are controlled. The means for and method of control will presently be fully described.

The emergency braking means, which, as here shown, applies only to the rear wheels of the present vehicle, comprises brake operating cables 30—30 which are connected, respectively, with the conventional brake operating means of the two rear wheels, and lead forwardly therefrom and are connected to a transversely directed braking lever 33, that is pivotally fixed at one end, as at 34, to the chassis or frame of the vehicle. The usual emergency brake handle or lever, which is disposed in a position easily accessible to the vehicle operator, is designated in Fig. 1 by numeral 35, and it is operatively connected with the free end of lever 33 by a pull cable 36 in such manner that pull on the handle 35 by an operator will operate, through cable 36, to pull the swinging end of lever 33 forwardly and by this movement apply the emergency brakes through the mediacy of cables 30—30.

It is shown in Fig. 1 that the pull cable 36 passes freely through a hole in the lever 33 and then continues axially through a helically coiled spring 37 that seats against the outer end of the lever. Thus, the brake setting force as applied through the pull cable, is exerted against lever 33 through compression of the coiled spring 37. It is also shown that the lever 33 is connected at its swinging end by a pull rod 39 with the diaphragm 16d of the booster cylinder 16 in such manner that the application of suction to the booster cylinder 16, through pipe line 23 will energize the booster 16 and cause it to pull the lever 33 to a brake releasing position against the resistance of spring 37, although the brake handle 35 may at that time be latched in brake setting position.

In Figs. 1 and 5, the vehicle accelerator pedal is designated by numeral 40. It is shown as being pivotally supported at its lower end by a pivot member 41 and is adapted to be depressed, by foot pressure in the usual way, through a substantial arc of travel. When there is no pressure applied downwardly against the accelerator pedal 40, it automatically assumes a position at the higher end of its arc of movement under spring action as is usual. As the pedal 40 is depressed through its arc of travel against spring applied resistance, it moves progressively and successively through three operating arcs which in Fig. 5 have been designated as the "braking arc," the "coasting arc" and the "power arc." The braking arc, which is at the initial or higher end of the arc of downward movement of the pedal at present extends through an interval of approximately 16°; the coasting arc extends through about 4° and the power arc through about 40°.

The accelerator pedal may be operatively connected with the throttle lever of the carburetor in various ways. However, in the present showing it is connected through a succession of links and levers which I have designated by reference numerals 42, 43, 44 and 45; the link 45 being pivotally connected at one end to the valve actuating lever 4 of the carburetor; this connection is so made that the operation of the carburetor is effected in the usual manner by the pedal 40 only when moving in the power arc portion of its arc of movement.

The details of construction of the control valve 20 are best illustrated in Fig. 3, wherein the valve is shown to comprise a closed housing which, at one end, embodies a tubular or cylindrical portion 20a and at its other end a body casting 20x. The tubular part 20a is fitted at its outer end with an air filtering closure cap 50, and is formed at its inner end with a conically flared bell 51 of substantial diameter, having a peripheral flange 51' which is fitted in an annular seat 52 formed in the body or casting 20x which comprises the complemental or opposite end portion of the valve housing. The parts 20a and 20x together, as thus joined together, define a closed chamber which I will refer to as the "suction distributing chamber." This chamber is divided by a flexible rubber disk or diaphragm 54 which has its peripheral portion clamped between the seat 52 in part 20x and the flange 51' of part 20a in an air sealed joint. At one side of the diaphragm 54 is an air tight compartment 55 and at the other side of an air compartment 56; this latter being within the conically flared end portion of the part 20a.

Formed in the valve body 20x, in coaxial alignment with the cylindrical part 20a, is a straight bore 57 which opens at its inner end into the compartment 55. At its outer end, the bore 57 has a pipe fitting 58 threaded thereinto and it is to this particular fitting that one end of the suction line 23 leading to booster cylinder 16 is connected.

Leading downwardly into the valve body 20x, in respect to its showing in Fig. 3, is a bore or channel 59. This opens at its inner end into the inner end portion of the bore 57, and at its outer end has a pipe fitting 60 threaded thereinto, and it is to this fitting that one end of the suction line 21, which leads to the suction manifold 2 of the engine, is connected.

Directed angularly upward into the valve body member 20x from its lower side, is a bore or channel 62 which also opens into the chamber 55. A pipe fitting 63 is threaded into the outer end of this latter bore and to this fitting the suction line 22, leading to the booster cylinder 15, is connected. Therefore, it will be understood, by reference to Figs. 1 and 3, that when the vehicle engine is in operation, suction as created in the engine manifold 2 will be transmitted through pipe connection 21, the bore 59 and the bore 57 to the compartment 55.

It is the function of this valve mechanism 20, under control of the throttle pedal 40, as actuated by the vehicle driver in the normal operation of driving of the vehicle, to control the application of suction to the booster cylinders 15 and 16 for an automatic braking and brake control action. Thus, the usual service brake pedal is not required and the functional operations of these brakes becomes automatic as presently understood.

The flexible rubber diaphragm 54 which divides the suction distributing chamber of the valve 20 into the two compartments 55 and 56 is one of the elements for controlling the application of suction to the booster cylinders. It is shown in Fig. 3 as being disposed quite closely to the open inner end of the bore 57 and to be formed with a central opening 65 that is substantially greater in diameter than the inner end of the bore 57. Fixed to one side of the diaphragm 54 and within the air compartment 56, and centered about the diaphragm opening 65, is a cup-shaped, spring enclosing housing 66. This housing, for a purpose presently explained, is provided with an air port or passage 66' in its bottom wall. Applied to the other side of the diaphragm, within chamber 55, and centered with respect to the diaphragm opening 65 is an annular disk 67; the diameter of the opening through this disk being less than the diameter of opening 65 so that the inner part of the disk can serve as a valve seat. Contained in the housing 66 is a disk valve 68 that is adapted to move into the diaphragm opening 65 and close against the inner peripheral portion of the annular disk 67, thus to close the diaphragm passage as shown in Fig. 3. A coiled spring 70, located in the housing 66 bears at its opposite ends against the disk valve 68 and housing end wall to yieldingly urge the valve 68 to a closed position against the disk 67.

The disk valve 68 is centrally fixed to one end of a rod or stem 75 which at its other end has a lost motion or slip connection with a sliding valve member 76 that is contained with clearance in the bore 57. This sliding valve is adapted, under control of the movements of valve disk 68 as permitted by movements of the diaphragm 54 to be closed against the inner end of the fitting 58, and thus to close off the suction connection through the bore 57 and pipe line 23 with the booster cylinder 16.

A coiled spring 77 is seated against a shoulder 78 in the bore 57 and bears against the valve member 76 to yieldingly urge it toward closing position against the end of fitting 58. This valve can be unseated, however, by pull of rod 75 through action of diaphragm 54 in an opposite direction.

A valve disk 79 is contained in the bore 62 to close against the inner end of fitting 63, and this disk is formed with a small air port p therethrough. A coiled spring 62s bears against the disk to yieldingly urge it to seated position against the fitting.

The inner end of the cylindrical portion 20a of the valve housing 20, adjacent the conical flare 51, has a closing wall 80, and formed integral with this wall, coaxially of the cylindrical body 20a and extended toward its filter closed outer end, is a cylindrical guide 81 in which a tubular slide 82 is reciprocally fitted. This slide 82 has an outturned, peripheral flange 84 at its outer end and has an inturned flange 85 at its inner end. A heavy spring coil 86 is disposed in the housing 20a and is held under compression between the wall 80 and flange 84. Also, there is a coiled spring 87 of substantially lesser strength than spring 86, contained axially within the slide 82. This is seated at one end against the flange 85 and at its other end against a flanged nut 88 applied to one end of a bolt 90 that is fixed at its other end in the bottom wall of housing 66 to extend therefrom coaxially of and into the slide 82. The spring 87 operates in accordance with its extent of compression, to resist inward deflection of the diaphragm 54 under pull of vacuum in chamber compartment 55 when the slide 82 is in the position shown in Fig. 3.

Seated flatly against the flanged outer end of the tubular slide 82, within the cylindrical chamber 20a, is a disk 92 which mounts a roller 93 centrally thereof on an axis 94. This roller, under force of the coiled spring 86, bears in rolling contact against the periphery of a circular cam 95 fixed concentrically on a cross-shaft 96 that extends rotatably through the housing 20a perpendicular to its axial lines at one end, the shaft 96 has a lever arm 97 fixed thereto, and this lever is operatively connected at its outer end with the horizontal link 44 to which, in Figs. 1 and 5, the carburetor throttle lever 4 is shown to be operatively connected by the link 45.

The cam 95 is formed at one side with a recess or depression 99 into which the roller 93 will move gradually under force of spring 86, when the cam is rotated to a proper position to receive it. Rotation of the cam 95 under control of lever arm 97, as moved by link 44, also will cause the roller to be lifted from the depression, to ride on the circular periphery of the cam and in so doing to cause the slide 82 to be shifted inwardly against the yielding force of spring 86, to the left in reference to its showing in Fig. 3.

Whenever the vehicle engine is running, vacuum or suction will be created in the manifold 2 and transmitted through the pipe connection 21 to valve 20 and to chamber 55 thereof. When the vehicle is standing still, and idling, the accelerator pedal 40 will be in its fully raised position, the carburetor valve 3 will be closed, and the cam shaft actuating lever 97, as connected to the throttle lever linkage 44 will be in such position that the cam roller 93 will be fully seated in the cam recess 99, and the slide 82 will be held by the force of spring 86 in such position that force of spring 87 acting through bolt 90 and housing 66 will have flexed the diaphragm 54 and caused the unseating of valve disk 68 from the end of bore 57 and opened valve 76. Therefore, suction is transmitted to chamber 55 and from it through bore 62 and pipe connection 22 to booster cylinder 15, also, through bore 57 and pipe connection 23 to booster cylinder 16, thus to effect the application of the service brakes and the release of the emergency brakes.

Now, to start the vehicle moving under influence of the vehicle engine, the accelerator pedal is depressed through the braking arc and into the power arc. With this movement, the cam 95 acts against roller 93 and forces the slide 82 against the resisting pressure of spring 86 and lessens the holding force of spring 87 to such extent as to allow suction in chamber 55 to pull the diaphragm 54 to the left, from its Fig. 3 position and in doing this, allows valve 76 to close off the connection to the emergency brake booster cylinder 16 and trap the vacuum therein so that the emergency brakes are then held in released position. It also allows valve 68 to close over the end of bore 57 to close off the chamber 55. Suction in the service brake connection 22 is then relieved by outside air entering through the filter 50, slide 82, housing port 66' and housing 66 past the valve seat as provided by the annular member 67; this being pulled away from the disk 68 by reason of vacuum in chamber 55. The service brakes are thus released, and driving of the vehicle is effected in the normal way under control of the accelerator pedal as operated within the power arc.

While driving, if it is desired to apply braking force by means of the service brakes, the pressure on the accelerator pedal is eased off into the braking arc and the cam thus rotated to position for the entry of cam roller 93 into the cam recess 99. As the roller enters the recess, the spring 86 forces the slide 82 to follow and thus builds up pressure of spring 87 against nut 88 on bolt 90 to cause it to pull on the housing 66 and diaphragm 54 and thus cause disk 67 to pull the valve 68 from its seat over the suction bore 57, and thus effect an application of brake actuating suction to the service brake booster cylinder 15. As the suction in chamber 55 overcomes the built up pressure exerted by spring 87, it pulls the diaphragm back to the left and again seats the valve 68 to limit the braking force. The braking force that will thus be applied depends upon the extent to which the cam roller is permitted to enter the recess, 99, and this is governed by the extent to which the accelerator pedal is allowed to lift. If all holding pressure is removed from the pedal 40, then the cam roller becomes fully seated and under the force of spring 86 the slide 82 is shifed to such extent that pressure of spring 87 is so increased as to hold the valve 68 fully open and also to unseat the valve 76. So long as the engine is in operation, the emergency brake booster 16 will be energized by suction to hold the the emergency brakes released. When the engine is shut off, or stops, suction to booster 16 is cut off and the brakes 7 and 8 are allowed to be set by the force of spring 37 acting against lever 33.

The purpose of the valve disk 79 in the bore 62 from which the tube 22 leads to the booster cylinder 15, is to prevent any sudden inlet of air to the line 22 that would cause too quick or sudden release of the service brakes. It will be understood that the port p in the valve disk allows the air to enter gradually. The spring 62s is employed only to keep the disk 79 in proper place. It is not of sufficient strength to hold the disk against being unseated by vacuum.

It has been shown in Figs. 1 and 5 that the connection between the link 45 and the actuator link 44 is effected by passing the link 45 slidably through a bearing 44x carried pivotally by a bracket 44b on link 44. The link 45 has stops 45x against which the bearing will engage when the link 44 is actuated by the accelerator pedal moving into the power arc.

As an additional feature of safety, to effect an automatic setting of the emergency brakes in the event of loss of hydraulic pressure medium from the master cylinder 14, I provide an emergency vacuum releasing valve 110 interposed in the line 23, as seen in Fig. 1. This valve, as shown in section in Fig. 6, comprises a closed cylinder 112 divided by partitions 113—114 into top, central and lower compartments 115, 116 and 117, respectively. The suction line 23 leading from valve 20 opens into chamber 115. The continuation of the line leads from compartment 116 to booster cylinder 16. An air port 118 opens into compartment 117 and there is a central air port 119 in the wall 114. A valve stem 120 enters the housing through the top wall and is equipped at its lower end with a valve head 121 that is adapted to close upwardly over the port 119, under influence of a coiled spring 122 acting upwardly thereagainst. Another valve 123 is fixed on the rod 120 to close downwardly into an air passage 124 from chamber 115 into chamber 116. Under normal operation, the parts of valve 110 assume the positions shown in Fig. 6. However, if loss of liquid from cylinder 14 permits the master cylinder operating lever 18, when actuated by the booster 15, to swing beyond a normal arc of travel, an arm 125 fixed on its lower end will engage the upper end of valve rod 120 and push it downwardly. This unseats valve head 121 and admits outside air to the booster cylinder 16, whereupon the emergency brakes will be set by the force of spring 37 applied through lever 33. Whenever the valve 121 is opened, the valve 123 moves down to close over the port 124 and thus prevents loss of vacuum in the valve chamber 55 through the connecting pipe 23.

In order that the accelerator pedal 40 may be held at any set position in the power range, I have provided what I call a "cruise control," as shown in Fig. 3. This comprises a ratchet wheel 130 fixed on the shaft 96 at one side of housing 20. This is enclosed by a housing 131 in which a solenoid 132 is contained. A pawl 133 is mounted in housing 131 by a pivot 134 and an arm 135 extends from the pawl to adjacent the core 136 of the solenoid.

Should it be desired to engage the pawl with the wheel 130, the solenoid is energized. This causes the core to magnetically pull the arm 135 against its end and thus engage the pawl 133 with teeth of the wheel 130 and hold it against turning, and in this way hold the throttle pedal 40 at the position in which it was depressed at that time. Energization of the solenoid is through depression of a switch button 137 which controls the solenoid circuit as illustrated in Fig. 1. This button may be conveniently located on the instrument panel of the vehicle.

In Figs. 7 to 10, I have illustrated the present system as being equipped, as an alternative, with a combined master cylinder and booster cylinder, and with this the emergency valve of Fig. 6, has also been associated. In Fig. 7, parts that correspond to those already described have been given like reference numerals. The combined master cylinder and booster, as best shown in Fig. 8, comprises a cylinder 140, closed at one end by a wall 140' formed with air ports as at 141 covered with glass wool filter 142. Fitted and secured in the other end of the cylinder is a head 143.

Contained in the cylinder is a piston 144 equipped with rod 145 that extends, as a piston, into a hydraulic cylinder 146 that is integrally formed with the cylinder head. The cylinder 140 corresponds to booster cylinder 15 of Fig. 1, and the cylinder 146 corresponds to the master cylinder 14. At its outer end, the cylinder 146 is equipped with a fitting 148 to which pipe line 13 connects. A storage tank 149 is formed on the cylinder head 143 to feed the cylinder 146 through a port 150.

In this arrangement of the cylinder 140, the pipe line 22 opens into the cylinder through the head 143, and suction applied through this line pulls the piston 144 inwardly against the pressure of a spring 153, and actuates the piston rod 145 into cylinder 146 to apply braking force against the hydraulic medium in the braking system for application of the brakes.

The emergency valve mechanism as embodied in the booster cylinder is as shown best in Fig. 9. It comprises a valve housing 160 that is formed integral with the cylinder head 143. It is formed with an axial bore 162 through which a pin valve rod 163' passes to the interior of the cylinder 140 to terminate at a location to be engaged by the piston 144 under certain conditions. The bore 162 opens into the bore 175 at one side of housing 160, between its valve closed outer end and the inner end which is sealed against leakage about pin 163'. The continuation of pipe line 23, leading to the booster cylinder 16, leads from the opposite side of the bore 162 thus to provide an operating connection with the booster 16 under all normal conditions. However, should the hydraulic system lose its oil supply, then the piston 144 will be allowed to move an abnormal distance inwardly and in so doing will engage the inner end of pin 163' and shift it outwardly. This movement unseats valve 165 and admits outside air to the line 23 and in this way breaks the vacuum in cylinder 16 to effect the application of the emergency brakes under influence of spring 37x. In its inward movement, the pin 163 also covers the port communicating with pipe line 23 to the valve 20 and thus retains the vacuum therein.

It is noted in Fig. 9 that the pin 163 comprises one part that carries the valve 165; this part is slidably fitted in an extension 163' which has a lost motion connection with part 163. This provides that the part 163' can move inwardly, against pressure of a coiled spring 164 to cover the suction port 175 communicating with pipe line 23 and the valve 20 before the valve 165 is opened.

In Fig. 10, I have shown an emergency release for the cruise control latch mechanism that was illustrated in Fig. 3. In this illustration, parts corresponding to those previously described have been given the same reference numerals and will not again be described. However, in connection therewith is a second solenoid 232 with core bar 236 supported by light coiled spring 237 located between ends of core bars 236 and 136. The solenoid is connected in the vehicle horn circuit controlled by button 238.

The purpose of this second solenoid is to provide for a quick release of the pawl that holds the throttle valve in a set position and in instant setting of the brakes. For example, if the pawl 133 is locked in wheel 130, and a sudden emergency arises ahead of the car, the natural impulse is to sound the horn. This causes solenoid 232 to be energized and its core to be driven down against the core 136 with a hammer like blow that disengages the dog 133 from the wheel and allows the accelerator pedal to apply the brakes and return the engine to idling speed.

What is claimed is:

1. In an automobile having a driving power unit providing a source of suction, a power control, a power control pedal, a service brake control valve interconnected to the source of suction, brake operating power means interconnected with said valve, means for providing a lost motion connection between the power control pedal and the power control in an initial range of movement of said pedal so as to allow the power control to remain in idling position while the pedal is moved through this initial range, rigid linkage interconnecting said control pedal and said brake control valve for controlled operation of said brake control valve whereby said valve controls the suction force acting upon said brake operating power means, said valve and said power control being interconnected through said linkage so that as the pedal is depressed through the initial range the brakes are gradually released before the lost motion is fully taken up and the pedal begins to operate the power control and conversely as the pedal is released through this initial range the brakes are gradually applied before the pedal is fully released, including an emergency brake control arm adapted for hand control through a spring and means interconnected with said brake control valve for releasing the emergency brakes by moving the control arm in opposition to the spring force to release the brakes whenever the power unit is started, so that the hand control may be left locked in an emergency brake-on position and the release means will automatically return the control arm to the braking position when the power unit is shut off.

2. In an automobile having an engine with an intake manifold and a throttle control, and a service brake power means, the combination of a normally resiliently raised power drive operating foot pedal having a lost motion connection with the throttle control so that it starts moving the throttle control only after it is depressed through an initial substantial portion of its total range of depression, control means for pneumatically operating said service brake power means by suction from said intake manifold, rigid linkage connecting said pedal to said control means for maintaining the service brakes fully applied when the pedal is fully released and for gradually reducing the force of application as the pedal is initially depressed until the brakes are fully released before said lost motion is taken up, and, conversely, so that as the pedal is allowed to rise during this range of pedal depression the brakes are gradually applied until full application is achieved when the pedal is fully released or raised, including an emergency brake control arm connected to an emergency brake handle, pneumatic power means, connected to said control means and responsive to the starting of the engine for moving said emergency control arm to its brakes-released position, and for energizing said service brake power means to respond to the position of the foot pedal.

3. The combination defined in claim 2, and safety means responsive to failure of the service brakes and the resultant over travel of the service brake power means, for releasing said emergency control arm to set the emergency brakes on.

4. The combination defined in claim 2 wherein said emergency brake control arm is resiliently held in a brakes-on position, a booster cylinder for releasing said emergency brake control arm to its brakes-released position and conduit means between said booster cylinder and said valve means to normally conduct the vacuum from the engine intake manifold to said booster for releasing the emergency brakes during normal operation when the engine is running and the service brakes are on.

5. The combination defined in claim 4, and safety means responsive to failure of the hydraulic brake system and the resultant over travel of the service brake power means to render said booster cylinder ineffective thus returning said emergency brake control arm to its brakes-on position.

6. The combination defined in claim 5 wherein said safety means comprises valve means in said conduit means operative by the overtravel of the service brake power means to close off the portion of said conduit means leading toward the engine and opening the other portion to the atmosphere to render the booster cylinder ineffective.

7. In an automobile having an engine with an intake manifold and a throttle control, and a service brake power means, the combination of a normally resiliently raised power drive operating foot pedal having a lost motion connection with the throttle control so that it starts moving the throttle control only after it is depressed through an initial substantial portion of its total range of depression, control means for pneumatically operating said service brake power means by suction from said intake manifold, rigid linkage connecting said pedal to said control means for maintaining the service brakes fully applied when the pedal is fully released and for gradually reducing the force of application as the pedal is initially depressed until the brakes are fully released before said lost motion is taken up, and, conversely, so that as the pedal is allowed to rise during this range of pedal depression the brakes are gradually applied until full application is achieved when the pedal is fully released or raised, wherein said rigid linkage includes a single solenoid means for locking said pedal in any depressed position for maintaining the throttle control in a constant position so that the operator may remove his foot from the pedal for as long as no change of power is required, said locking means being immediately releasable upon resuming foot control by a slight depression of the pedal.

8. The combination as defined in claim 7, wherein said locking means comprises a ratchet operatively connected to said pedal, a normally disengaged pawl pivotally mounted to engage the ratchet, said solenoid for moving said pawl into engaged position, and a switch near the operator for energizing said solenoid, the resilient force urging the pedal to rise when the operator's foot is removed, as transmitted to the ratchet being sufficient to hold the pawl frictionally in engagement after said switch is opened, and until said force is relieved by a resumption of foot control.

9. The combination as defined in claim 8, and a second solenoid superimposed over the first one having an armature aligned with the armature of the first solenoid, electrical connections placing this solenoid in the horn circuit, said second armature being operative to strike the first one so as to release the pawl in the event it is engaged in the ratchet, thus releasing the pedal and setting the service brakes immediately in the event of an emergency arising requiring the spontaneous application of the horn while the foot is off the pedal.

10. In an automobile having an engine with an intake manifold and a throttle control, and a service brake power means, the combination of a normally resiliently raised power drive operating foot pedal having a lost motion connection with the throttle control so that it starts moving the throttle control only after it is depressed through an initial substantial portion of its total range of depression, control means for pneumatically operating said service brake power means by suction from said intake manifold, rigid linkage connecting said pedal to said control means for maintaining the service brakes fully applied when the pedal is fully released and for gradually reducing the force of application as the pedal is initially depressed until the brakes are fully released before said lost motion is taken up, and, conversely, so that as the pedal is allowed to rise during this range of pedal depression the brakes are gradually applied until full application is achieved when the pedal is fully released or raised, wherein the service brakes are hydraulically operated thru a master cylinder and said brake power means is a pneumatic booster cylinder directly connected to operate the plunger of said master cylinder with a controlled force and has resilient means for urging it into brakes-released position, a conduit between said booster cylinder control means and the intake manifold of the engine, valve means in the control means for controlling the degree of vacuum delivered thru this conduit to the booster cylinder to control said force, and a cam control for said valve means operatively connected to said foot pedal through said rigid linkage.

11. The combination of claim 10, wherein said emergency control arm is resiliently held in the brakes-on position, a booster cylinder for releasing said emergency brake control arm to its brakes-released position, and conduit means between said last named booster cylinder and said control means to normally conduct the vacuum from the engine intake manifold to said booster cylinder for automatically releasing the emergency brakes during normal operation when the engine is running.

12. In an automobile having an engine with an intake manifold and a throttle control, and a service brake power means, the combination of a normally resiliently raised power drive operating foot pedal having a lost motion connection with the throttle control so that it starts moving the throttle control only after it is depressed through an initial substantial portion of its total range of depression, control means for pneumatically operating said service brake power means by suction from said intake manifold, rigid linkage connecting said pedal to said control means for maintaining the service brakes fully applied when the pedal is fully released and for gradually reducing the force of application as the pedal is initially depressed until the brakes are fully released before said lost motion is taken up, and, conversely, so that as the pedal is allowed to rise during this range of pedal depression the brakes are gradually applied until full application is achieved when the pedal is fully released or raised, wherein said control means comprises a valve body having a cylindrical casing, a cam with a depression in its periphery fixed on a shaft rotatably mounted diametrically near the outer end of said casing, said end having a perforated cover and air filter means for said perforations, said cam shaft extending thru said casing to receive an arm fixed thereto and connected for operation by said foot pedal to oscillate said cam, a roller tappet reciprocally mounted in said casing and resiliently urged against said cam, a flaring circular flange at the other end of said casing, a three way conduit fitting having a complementary annular groove for said flange, a diaphragm with a central opening mounted between said groove and flange, its central portion being resiliently connected to said tappet and having an annular seat extending into said opening, a check valve resiliently urged toward said seat and having a stem with an enlarged end extending into said fitting, a check valve for the conduit in said fitting which is connected to said service brake power means to prevent loss of suction therein, said conduit check valve being loosely mounted for opening by the enlarged end on said stem when the tappet roller is in the depression of said cam at fully raised foot pedal position.

13. In an automotive braking system, a driving power unit having a manifold, means for controlling the acceleration of the power unit, a foot pedal, a control valve and a service brake power means, connecting means between the foot pedal, the acceleration control means and the valve, a conduit between the manifold and valve and a conduit between the valve and service brake power means; said valve comprising a housing, a shaft rotatably mounted in one end of the housing transversely thereof, a cam within the housing and mounted on the shaft, said shaft extending from the housing and joined to said connecting means, a diaphragm mounted in the opposite end of the housing, resilient means in the housing between the cam and diaphragm whereby rotation of the shaft and cam produces movement of the diaphragm, an end closure member for the housing secured to the housing adjacent the diaphragm as an extension of the housing, a plurality of ports in said closure member, the conduit to the manifold communicating with one of said ports and the conduit to the service brake power means communicating with another of said ports, an emergency brake power release means connected to a third port, a port closing valve mounted in the port communicating with the emergency brake power release means, a central opening in said diaphragm, a closure for said opening and means interconnecting said closure and said port closing valve.

References Cited in the file of this patent

UNITED STATES PATENTS

| 2,135,071 | Folberth | Nov. 1, 1938 |
| 2,200,973 | Struck | May 14, 1940 |
| 2,325,771 | Hemphill | Aug. 3, 1943 |
| 2,467,485 | Krieg | Apr. 19, 1949 |
| 2,648,413 | Russell | Aug. 11, 1953 |